G. W. Rains,

Steam-Boiler Indicator.

No. 1,016. Reissued July 24, 1860.

Witnesses:
J. W. Coombs
C. S. Spencer

Inventor:
G. W. Rains
per Munn & Co.
Attorneys.

UNITED STATES PATENT OFFICE.

GEORGE W. RAINS, OF NEWBURG, NEW YORK.

IMPROVED FEED-WATER APPARATUS FOR STEAM-BOILERS.

Specification forming part of Letters Patent No. 28,011, dated April 24, 1850; Reissue No. 1,016, dated July 24, 1860.

*To all whom it may concern:*

Be it known that I, GEORGE W. RAINS, of Newburg, in the county of Orange and State of New York, have invented a new and Improved Feed-Regulator and Low Water Alarm for Steam-Boilers; and I do hereby declare that the following is a full, clear, and exact description of the same, reference being had to the accompanying drawings, forming part of this specification, in which—

Figure 1:
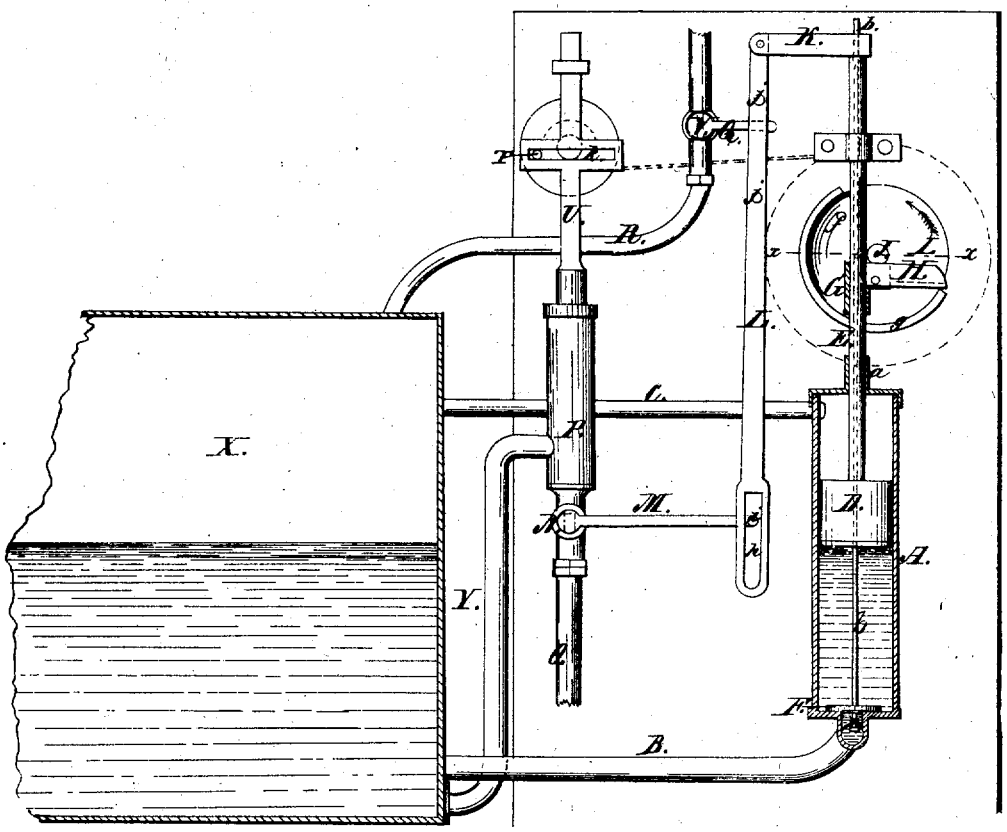
Figure 2:
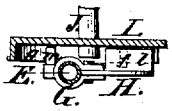

Figure 1 is an elevation, partly in section, of the apparatus. Fig. 2 is a horizontal section of part of the same in the line *x x* of Fig. 1.

Similar letters of reference indicate corresponding parts in both figures.

My invention consists in a novel, simple, and effective contrivance for regulating the quantity of water forced into a steam-boiler by a force-pump or other feed apparatus, so as to maintain about the same level of water in the boiler under all circumstances while the supply does not fail at its source, and in case of such failure to give an alarm in time to prevent injurious consequences.

To enable others skilled in the art to make and use my invention, I will proceed to describe its construction and operation.

A represents a hollow upright cylinder of brass or other metal about ten inches in height, arranged near the boiler, with the middle of its length at or near the height of the proper water-level, connected at its lower end by a pipe, B, with the water-space of the boiler, and near its upper end by a pipe, C, with the steam-space thereof, so that it is always supplied with water from the boiler to the height of the level in the boiler itself.

D is a solid piston, fitted so loosely to the interior of the cylinder A that steam may pass freely around it. This piston is furnished with a hollow rod, E, which passes through a stuffing-box, *a*, in the closed upper end of the said cylinder and through a fixed guide, E′.

F is a puppet-valve, fitted to a seat at the bottom of the cylinder for the purpose of closing the mouth of the pipe B, and having attached to it a long rod, *b*, which passes right through the piston D and its hollow rod E, which is fitted with a stuffing-box at the top to prevent the escape of steam around the rod *b*. The said valve has attached below it a stop, *e*, to prevent its being raised beyond a certain distance from its seat. The piston-rod E is fitted with a loose sleeve, G, which is fitted with a dog, H, so applied that pressure underneath it will make it bite the said rod so that the said rod may be lifted by it, but that the said dog when not supported will by its own weight free itself from the said rod and permit the sleeve G to slide down the said rod.

I is a disk attached to a horizontal shaft, J, and arranged near the piston rod, with its face parallel with the said rod, and having projecting from its face a pin, *f*, so arranged that in the revolution of the shaft and disk it (the pin *f*) may catch under a projection, *l*, (see Fig. 2,) on one side of the dog H, and so force it upward, and make it lift the said rod and the piston. The said disk has also on its face a projecting rim, *g*, extending about or more than half-way round, the projection of said rim being sufficiently prominent to serve as a resting-place either for a projection, *m*, on the sleeve G, or the projection *l* on the dog H, as will be presently more fully described. The shaft J and disk I rotate very slowly—one or two revolutions every minute will be sufficient.

K is an arm attached rigidly to the piston-rod, and having suspended from it a rod, L, in the lower part of which there is a slot, *h*, whose length may be equal or nearly equal to the distance which the piston-rod E and piston D are raised by the action of the pin *f* upon the dog H, the said slot receiving a pin, *i*, which projects from a lever, M, attached to a cock, N, or its equivalent, in the suction-pipe O of the feed-pump P. The said rod has also projecting from one side of it two pins, *j j′*, between which is situated a lever, Q, attached to a cock, V, in a steam-pipe, R, the lower end of which communicates with the steam-space of the boiler, and to whose upper end is attached a steam-whistle. The distance between the pins *j j′* should be about equal to the distance the piston is lifted.

T is a crank for operating the feed-pump, working in a slot, *k*, in the plunger-rod U.

Y is the force-pipe, leading from the feed-pump to the boiler.

The operation of the apparatus is as follows

The piston D is raised once during every revolution of the disk I by the action of the pin *f* upon the dog H, and is disengaged from the said dog, and thereby permitted to drop on the escape of the said pin from the dog at a certain point in its (the pin's) revolution. The valve F is raised with the piston as far as permitted by the stop *e* by the friction of the stuffing-box at the upper end of the piston-rod upon the rod *b*, and is closed again early in the descent of the piston by its being carried down again by the said friction, thus cutting off the water in the cylinder from the boiler to prevent its being forced back into the boiler by the fall of the piston upon it. The piston in its fall strikes the water and its descent is thereby almost stopped, but as it sinks slowly a little farther, the projection *m* on the sleeve G is caught by the projecting rim *g* of the disk I, and the farther descent of the sleeve prevented, and the rim *g* immediately afterward coming in contact with the dog H makes the said dog grip the piston and arrest its farther descent and lift it up till it raises the piston just above the surface of the water in the cylinder, where it holds it till the pin *f* arrives at the catch and lifts the piston again, as before described.

In the above operation it will be evident that the piston D is arrested at or just below the water-level of the boiler, whether this be high or low, and the upward movement of the said piston is always to the same distance above such level, and hence any variation in such level causes the rod L, which rises or falls with the piston, to act, by means of its slot *h*, on the lever M of the cock N in the suction-pipe, to give a greater or less opening to the said cock or to close the same entirely, (the said cock closing by the upward movement of the said lever, and vice-versa,) and hence the supply of water to the boiler is always in proportion to the level while the source of supply does not fail, or is suspended entirely when a certain level is reached.

When the level in the boiler sinks to a certain point, the pin *j* in the rod L, striking the lever Q of the alarm cock V, opens the said cock and causes the alarm to be sounded and continued till the level rises in the boiler; but as the said level rises the pin *j*, when the piston is lifted, raises the said lever Q and closes the said cock, and the pin *j'* in its descent fails to open it.

I do not claim, broadly, controlling the opening of a cock in the suction-pipe of the feed-pump by the level of the water in the boiler, as I am aware that this has been attempted by means of a float, which is admitted to be very unreliable in its action, and also by other means; but

What I claim as my invention, and desire to secure by Letters Patent, is—

1. The combination of the cylinder A, connected with the boiler as described, the piston D working in the said cylinder, and having an attached valve whose movements to open and close the communication between the said cylinder and the boiler are effected by the said piston or its rod substantially as herein described, a lifting and disengaging apparatus for lifting and dropping the said piston and valve, and a connection between the piston and a cock or valve in the suction-pipe or its equivalent, the whole operating substantially as herein described, to control the supply of water to the boiler.

2. In combination with the above specified apparatus the alarm cock V, applied in connection with the piston, to operate substantially as herein set forth.

GEO. W. RAINS.

Witnesses:
LOUIS H. BLACKMAN,
ELI H. EVANS.